(12) United States Patent
Glass et al.

(10) Patent No.: US 12,482,585 B2
(45) Date of Patent: Nov. 25, 2025

(54) SURGE ARRESTER

(71) Applicant: Hitachi Energy Ltd, Zürich (CH)

(72) Inventors: Martin Glass, Rheinfelden (DE); Ektor Sotiropoulos, Horgen (CH); Bernhard Richter, Wettingen (CH)

(73) Assignee: Hitachi Energy Ltd, Zürich (CH)

( * ) Notice: Subject to any disclaimer, the term of this patent is extended or adjusted under 35 U.S.C. 154(b) by 150 days.

(21) Appl. No.: 18/282,397

(22) PCT Filed: Mar. 17, 2022

(86) PCT No.: PCT/EP2022/056929
§ 371 (c)(1),
(2) Date: Sep. 15, 2023

(87) PCT Pub. No.: WO2022/194987
PCT Pub. Date: Sep. 22, 2022

(65) Prior Publication Data
US 2024/0170188 A1    May 23, 2024

(30) Foreign Application Priority Data
Mar. 18, 2021   (EP) ..................... 21163542

(51) Int. Cl.
*H01C 7/12* (2006.01)
*H01C 1/022* (2006.01)
(Continued)

(52) U.S. Cl.
CPC ............... *H01C 7/12* (2013.01); *H01C 1/022* (2013.01)

(58) Field of Classification Search
CPC .......... H01C 7/12; H01C 1/022; H01C 1/028; H01C 7/102
(Continued)

(56) References Cited

U.S. PATENT DOCUMENTS 2,296,708 A    9/1942 Earle
4,463,405 A    7/1984 Koch et al.
(Continued)

FOREIGN PATENT DOCUMENTS

CN    200969260 Y   10/2007
CN    101465187 A    6/2009
(Continued)

OTHER PUBLICATIONS

International Search Report and Written Opinion of the International Searching Authority, PCT/EP2022/056929, mailed Jul. 21, 2022, 13 pages.

*Primary Examiner* — Sean Kayes
*Assistant Examiner* — Lucy M Thomas
(74) *Attorney, Agent, or Firm* — Sage Patent Group (57) ABSTRACT

A surge arrester is provided that comprises an elongate housing, an active member, and an enclosure. The elongate housing has an interior comprising an interior surface that extends along a longitudinal axis between a first end and a second end of said housing. The active member is arranged at least partially within the interior. The enclosure is fixed to or integrally with the housing and closes the interior at the first end. The enclosure comprises a predetermined breaking line. In the event of a fault condition, e.g., a short circuit condition, the pressure within the housing increases and the predetermined breaking line allows for a defined breaking of the enclosure.

20 Claims, 4 Drawing Sheets

(51) Int. Cl.
*H02H 1/00* (2006.01)
*H02H 1/04* (2006.01)
*H02H 3/22* (2006.01)
*H02H 9/06* (2006.01)

(58) Field of Classification Search
USPC .......................................................... 361/118
See application file for complete search history.

(56) References Cited

U.S. PATENT DOCUMENTS

| | | | | |
|---|---|---|---|---|
| 4,503,414 A | * | 3/1985 | Sykes | H01H 85/44 361/131 |
| 4,663,692 A | * | 5/1987 | Carothers | H01C 7/12 361/123 |
| 4,710,847 A | * | 12/1987 | Kortschinski | H02H 7/24 361/124 |
| 6,430,020 B1 | * | 8/2002 | Atkins | H01C 7/12 361/127 |
| 7,154,726 B2 | * | 12/2006 | Barlage | H01C 7/12 361/127 |
| 2018/0183232 A1 | * | 6/2018 | Tavcar | H02H 9/044 |

FOREIGN PATENT DOCUMENTS

| | | |
|---|---|---|
| CN | 101707105 A | 5/2010 |
| CN | 203070856 U | 7/2013 |
| CN | 203351322 U | 12/2013 |
| CN | 203521081 U | 4/2014 |
| CN | 203659558 U | 6/2014 |
| CN | 109215907 A | 1/2019 |
| CN | 208607983 U | 3/2019 |
| CN | 208706344 U | 4/2019 |
| CN | 208834824 U | 5/2019 |
| DE | 3815666 A1 | 3/1989 |
| DE | 102012008484 A1 | 10/2013 |
| EP | 2124305 A1 | 11/2009 |
| FR | 1054738 A | 2/1954 |
| GB | 1005040 A | 9/1965 |
| JP | 2008177508 A | 7/2008 |
| JP | 2008178274 A | 7/2008 |
| JP | 5159852 B2 | 3/2013 |
| WO | 2019238453 A1 | 12/2019 |

* cited by examiner

SURGE ARRESTER

CROSS REFERENCE TO RELATED APPLICATIONS

This application is a 35 U.S.C. § 371 national stage application of PCT International Application No. PCT/EP2022/056929 filed on Mar. 17, 2022, which in turn claims priority to European Patent Application No. 21163542.0, filed on Mar. 18, 2021, the disclosures and content of which are incorporated by reference herein in their entirety.

FIELD

The present disclosure relates to a surge arrester.

BACKGROUND

A surge arrester is a device for protecting an electrical equipment from over-voltages caused by, e.g., lightning or switching operations.

To protect a unit of equipment from transients occurring on an attached conductor, a surge arrester is connected to the conductor, typically just before it enters an interior of the equipment. The surge arrester is also connected to ground and functions by routing energy from an over-voltage transient to ground if one occurs, while isolating the conductor from ground at normal operating voltages. This is usually achieved through use of a varistor, which has substantially different resistances at different voltages. Typically, the varistor is arranged within a housing of the surge arrester.

Under a fault condition, such as a short circuit event, the varistor heats and an arc occurs in the surge arrester causing an increase in pressure within the housing of the arrester. Usually, the varistor breaks under such circumstances. Generally, there is a risk that the arc burns through the housing, leading to a violent shattering and ejection of critical parts.

There is a need for a further improved or alternative surge arrester.

SUMMARY

This object may be achieved by the independent claim. Dependent claims refer to additional embodiments. Additional or alternative aspects of the present disclosure are addressed throughout this specification. According to the present disclosure, a surge arrester is provided that comprises an elongate housing, an active member, and an enclosure. The elongate housing has an interior comprising an interior surface that extends along a longitudinal axis between a first end and a second end of said housing. The active member is arranged at least partially within the interior and extending along the longitudinal axis. The enclosure is fixed to or integrally formed with the housing and closes the interior at the first end. The enclosure comprises a predetermined breaking line.

In the event of a fault condition, e.g., a short circuit condition, the pressure within the housing increases and the predetermined breaking line allows for a defined breaking of the enclosure. This may allow part of the enclosure to break off while the remaining part of the enclosure may stay connected to or formed with the housing.

The active member may have a cross-section that extends, at least partly, radially beyond the breaking line. The cross-section of the active member is particularly a cross-section normal, i.e. perpendicular, to the longitudinal axis. Radially may be understood herein so as to refer to a direction generally perpendicular to the longitudinal axis. Thus, the active member may move, caused by the increased pressure, along the longitudinal axis towards the first end. However, this movement can be stopped since the active member has a cross-section that extends, at least partly, radially beyond the breaking line. Thus, while controlled movement of the active member is admitted to at least some extent, an uncontrolled ejection of critical parts can be reliably prevented. In this manner the operational safety of the surge arrester is increased.

The breaking line may extend around the longitudinal axis or an axis being parallel thereto, defining an inner enclosure portion and an outer enclosure portion. The inner enclosure portion is particularly a radially inner portion of the enclosure with respect to the longitudinal axis or an axis parallel thereto. In some embodiments, the longitudinal axis intersects the inner enclosure portion. The outer enclosure portion is particularly a radially outer portion of the enclosure with respect to the longitudinal axis. The inner enclosure portion and the outer enclosure portion may solely be separated from each other by the predetermined breaking line.

The design of the surge arrester is such that a pressure increase due to a short circuit event effectuates a breaking of the enclosure along the predetermined breaking line, such that the inner enclosure portion separates from the outer enclosure portion, wherein the outer enclosure portion remains connected to the housing, and wherein an opening in the outer enclosure portion is formed at the place where the inner enclosure portion has been located prior to the breaking.

The surge arrester is particularly suitable if it is a medium voltage surge arrester. Herein "medium voltage" is understood as indicating a voltage range between 1 kV to 70 kV.

The surge arrester may be designed such that an axial movement of the active member along the longitudinal axis towards the first end, for example caused by a short circuit event, interferes with the outer enclosure portion of the enclosure. More specifically, the outer enclosure portion may be designed to stop the axial movement of the active member along the longitudinal axis towards the first end. Thus, a defined movement may be promoted while said movement can be stopped particularly reliable.

The housing and the enclosure may be formed integral, i.e., as a one-piece element. Alternatively, the enclosure and the housing may be formed by separate parts. In some embodiments, the enclosure is fixed to the housing in a fluid-tight or gas-tight manner.

The inner surface of the housing may be coated by a coating layer comprising or consisting of an arc-quenching material, e.g., melamine, aromatic epoxy resin, linear aliphatic epoxy resin, aluminum hydroxide, or metal hydride.

The enclosure may extend at least substantially perpendicular to the longitudinal axis.

The breaking line and thus the radially inner end of the outer enclosure portion may be substantially ring-shaped. Thus, a stopping function of the outer enclosure portion can be achieved that is particularly uniform or symmetrical with respect to the longitudinal axis. However, other shapes may be chosen.

The surge arrester may further comprise a first discharge electrode provided at the first end of the housing, and a second connection electrode for connection to an electrical equipment, wherein the second connection electrode is provided at the second end of the housing. The active member may extend along the longitudinal axis between the first discharge electrode and the second connection electrode.

The active member may further comprise an insulation member, arranged at least partially within the interior of the housing. The insulation member may particularly comprise or be made from an electrically isolating material.

The active member may comprise a first active member portion having a first cross-sectional extent, and a second active member portion having a second cross-sectional extent, the second cross-sectional extent extending radially beyond the first cross-sectional extent. A cross-sectional extent of the predetermined breaking line may be radially completely contained within the second cross-sectional extent. In this manner, the second active member portion can stop the movement of the active member along the longitudinal axis, while the first active member portion may at least partly move through the opening formed within the outer enclosure portion allowing a particularly suited and defined pressure release.

A shoulder may be provided at a transition from the first to the second active member portion. The first active member portion may be provided closer to the first end than the second active member portion. For example, the shoulder may be a rib, such as a circumferentially extending rib. Alternatively, the shoulder may be a radially extending protrusion, for example one or several radially extending protrusions.

The shoulder may be formed by the insulation member.

The second active member portion may be designed to break in case of a short circuit event.

The relative cross-sections of the first active member portion and the inner enclosure portion may be such that the first mentioned cross-section may extend through the latter-mentioned, and that the cross section of the second active member portion is at least partly larger than that of the inner enclosure portion such that it may not extend through the opening resulting from the inner enclosure's breaking along the breaking line.

The second active member portion may comprise an outer wall portion that is shaped cylindrically with respect to the longitudinal axis in such a way that a movement of the outer wall portion along the longitudinal axis is guided by the interior surface. Alternatively, different mating shapes allowing such guidance may be foreseen. The interior surface of the interior of the housing may be shaped at least partly cylindrical. Particularly, the interior surface and the outer wall portion of the second active member portion may be shaped complementary to each other in such a way, that the second active member portion is guided by the interior surface during the movement of the active member along the longitudinal axis towards the first end.

The predetermined breaking line may at least substantially be circular. This is advantageous, since it may allow for a particularly easy manufacture and good distribution of forces.

The enclosure may support the active member, such as by supporting the first discharge electrode.

The surge arrester may further comprise a biased member that is arranged with respect to the longitudinal axis between the active member and the inner enclosure portion and that is biased in a direction parallel to the longitudinal axis. This may allow for a reliably positioning of the active member. Moreover, the biased member may support a breaking of the enclosure along the breaking line in a short circuit event, particularly by transmitting respective forces to the inner enclosure portion. In some embodiments, the biased member is arranged such that it causes a pressure acting against the active member directed along the longitudinal axis towards the second end of the housing.

The biased member may, at least to a first approximation, be ring-shaped and arranged surrounding the longitudinal axis. This may allow for a particularly uniform distribution of pressure with respect to the longitudinal axis.

The discharge electrode may be electrically and mechanically connected to the active member and extend through a through hole formed in the inner enclosure portion to the outside of the housing.

The biased member may surround the discharge electrode.

In particular, the present disclosure comprises the following aspects:

1. A surge arrester, comprising
    an elongate housing having an interior comprising an interior surface that extends along a longitudinal axis between a first end and a second end of said housing;
    an active member, arranged at least partially within the interior and extending along the longitudinal axis;
    an enclosure that is fixed to or integrally with the housing and that closes the interior at the first end, wherein the enclosure comprises a predetermined breaking.
2. The surge arrester of aspect 1, wherein the active member has a cross-section that extends, at least partly, radially beyond the breaking line.
3. The surge arrester of aspect 1 or 2, wherein the predetermined breaking line extends around the longitudinal axis, defining an inner enclosure portion and an outer enclosure portion.
4. The surge arrester of any of the preceding aspects, further comprising a first discharge electrode provided at the first end of the housing, and a second connection electrode for connection to an electrical equipment, said second connection electrode being provided at the second end of the housing.
5. The surge arrester of aspect 4, wherein the active member extends along the longitudinal axis between the first and second electrodes.
6. The surge arrester of any of the preceding aspects, wherein the active member comprises an insulation member, arranged at least partially within the interior.
7. A surge arrester, comprising
    an elongate housing having an interior comprising an interior surface that extends along a longitudinal axis between a first end and a second end of said housing;
    a first discharge electrode provided at the first end of the housing;
    a second connection electrode for connection to an electrical equipment, said second connection electrode being provided at the second end of the housing;
    an active member, arranged at least partially within the interior and extending along the longitudinal axis between the first and second electrodes;
    an enclosure that is fixed to or integrally with the housing and that closes the interior at the first end;
    the active member comprising an insulation member, arranged at least partially within the interior,
    wherein the enclosure comprises a predetermined breaking line extending around the longitudinal axis, defining an inner enclosure portion and an outer enclosure portion,
    wherein the active member has a cross-section that extends, at least partly, radially beyond the breaking line.
8. The surge arrester of any of the preceding aspects, wherein the surge arrester is a medium voltage surge arrester, such as wherein medium voltage is defined by 1 kV to 70 kV.

9. The surge arrester of any of the preceding aspects, wherein the surge arrester is a plug-in surge arrester.

10. The surge arrester of any of the preceding aspects, wherein the first discharge electrode extends as seen along the longitudinal axis beyond the first end of the housing and/or wherein the second connection electrode extends as seen along the longitudinal axis beyond the first end of the housing.

11. The surge arrester of any of the preceding aspects, wherein the housing and the enclosure are formed by separate parts.

12. The surge arrester of aspect 11, wherein a connection between the outer enclosure portion and the housing is more stable than a connection between the outer enclosure portion and the inner enclosure portion as defined by the predetermined breaking line.

13. The surge arrester of any of the preceding aspects, wherein the inner enclosure portion has an inner enclosure portion extension along the longitudinal axis, and the outer enclosure portion has an outer enclosure portion extension along the longitudinal axis, wherein the inner enclosure portion extension is smaller than the outer enclosure portion extension.

14. The surge arrester of aspect 11, wherein the enclosure is fixed to the housing in a fluid-tight manner.

15. The surge arrester of any of the preceding aspects, wherein the enclosure extends at least substantially perpendicular to the longitudinal axis.

16. The surge arrester of any of the preceding aspects, wherein the enclosure has a first extension along the longitudinal axis and a second extension perpendicular to the longitudinal axis, wherein the first extension is smaller than the second extension, such as, wherein the first extension is smaller than 25% of the second extension.

17. The surge arrester of any of the preceding aspects, wherein the inner enclosure portion of the enclosure is, with respect to the longitudinal axis, a radially inner enclosure portion.

18. The surge arrester of any of the preceding aspects, wherein the outer enclosure portion of the enclosure is, with respect to the longitudinal axis, a radially outer enclosure portion.

19. The surge arrester of any of the preceding aspects, wherein the breaking line is annular, such as ring-shaped.

20. The surge arrester of any of the preceding aspects, wherein the outer enclosure portion is ring-shaped.

21. The surge arrester of any of the preceding aspects, wherein the insulation member comprises or is made of silicone.

22. The surge arrester of any of the preceding aspects, wherein the cross-section of the active member that extends, at least partly, radially beyond the breaking line is a cross-section perpendicular to the longitudinal axis.

23. The surge arrester of any of the preceding aspects, wherein the first discharge electrode and the second connection electrode are electrically connected to the active member.

24. The surge arrester of any of the preceding aspects, wherein the active member comprises or is made of one or more varistors, for example of metal oxide varistors.

25. The surge arrester of any of the preceding aspects, wherein the cross-section of the active member extends radially beyond the breaking line in a circumferentially complete manner.

26. The surge arrester of any of the preceding aspects, wherein the surge arrester is designed such that an axial movement of the active member along the longitudinal axis towards the first end interferes with the outer enclosure portion of the enclosure.

27. The surge arrester of any of the preceding aspects, wherein the outer enclosure portion is designed to stop an axial movement of the active member along the longitudinal axis towards the first end.

28. The surge arrester of aspect 26 or 27, wherein the axial movement of the active member along the longitudinal axis towards the first end is a movement induced by a short circuit event.

29. The surge arrester of any of the preceding aspects, wherein the active member comprises a first active member portion having a first cross-sectional extent, and a second active member portion having a second cross-sectional extent, the second cross-sectional extent extending radially beyond the first cross-sectional extent.

30. The surge arrester of aspect 29, wherein the first cross-sectional extent and the second cross-sectional extent are extents perpendicular to the longitudinal axis.

31. The surge arrester of aspect 29 or 30, wherein a cross-sectional extent of the predetermined breaking line perpendicular to the longitudinal axis is radially completely contained within the second cross-sectional extent.

32. The surge arrester of any of aspects 29 to 31, wherein a shoulder is provided at a transition from the first to the second active member portion, the first active member portion being provided closer to the first end than the second active member portion.

33. The surge arrester of aspect 32, wherein the shoulder is a rib, such as a circumferentially extending rib.

34. The surge arrester of aspect 32, wherein the shoulder is a radially extending protrusion.

35. The surge arrester of aspect 32, wherein the shoulder is one of several radially extending protrusions.

36. The surge arrester of aspect 32, wherein the first active member portion has a cylindrical surface having a first diameter and the second active member portion has a cylindrical surface having a second diameter that is larger than the first diameter.

37. The surge arrester of any of the preceding aspects, wherein the second active member portion is designed to break in case of a short circuit event.

38. The surge arrester of any of the preceding aspects, wherein the surge arrester is designed such that the predetermined breaking line breaks in case of a short circuit event.

39. The surge arrester of any of the preceding aspects, comprising the features of aspect 29, wherein the relative cross-sections of the first active member portion and the inner enclosure portion are such that the first-mentioned cross-section may extend through the later-mentioned, and wherein the cross section of the second active member portion is at least partly, e.g., circumferentially, completely larger than that of the inner enclosure portion such that it may not extend therethrough.

40. The surge arrester of any of the preceding aspects, wherein the second active member portion comprises an outer wall portion that is shaped, such as cylindrically with respect to the longitudinal axis, in such a way that a movement of the outer wall portion along the longitudinal axis is guided by the interior surface.

41. The surge arrester of any of the preceding aspects, wherein the breaking line is at least substantially circular.

42. The surge arrester of any of the preceding aspects, wherein the enclosure supports the active member, such as by supporting the first discharge electrode.

43. The surge arrester of any of the preceding aspects, further comprising a biased member arranged with respect to the longitudinal axis between the active member and the inner enclosure portion and being biased in a direction parallel to the longitudinal axis.

44. The surge arrester of aspect 43, wherein the biased member is arranged such that it causes a pressure acting against the active member directed along the longitudinal axis towards the second end of the housing.

45. The surge arrester of aspect 43 or 44, wherein the biased member is at least to a first approximation ring-shaped and arranged surrounding the longitudinal axis.

46. The surge arrester of any of the preceding aspects, the discharge electrode being electrically and mechanically connected to the active member and extending through a through hole formed in the inner enclosure portion.

47. The surge arrester of any of the preceding aspects, comprising the features of aspect 43, wherein the biased member surrounds the first discharge electrode.

48. The surge arrester of any of the preceding aspects, further comprising a centering element for centering the first discharge electrode with respect to the longitudinal axis.

49. The surge arrester of aspect 48, comprising the features of aspect 46, wherein the centering element extends through the through hole of the inner enclosure portion.

50. The surge arrester of any of the preceding aspects, further comprising a breaking supporting member for supporting a breaking of the breaking line in case of a fault condition, e.g., a short circuit event.

51. The surge arrester of aspect 50, wherein the breaking supporting member is fixedly connected to the active member and/or the first discharge electrode.

52. The surge arrester of any of the preceding aspects, wherein the inner surface of the housing is coated by a coating layer comprising an arc-quenching material, comprising one or more of melamine, aromatic epoxy resin, linear aliphatic epoxy resin, aluminum hydroxide, and metal hydride.

The subject-matter of the disclosure will be explained in more detail with reference to exemplary embodiments which are illustrated in the attached drawings, in which.

BRIEF DESCRIPTION OF THE DRAWINGS

DETAILED DESCRIPTION

Figure 1:
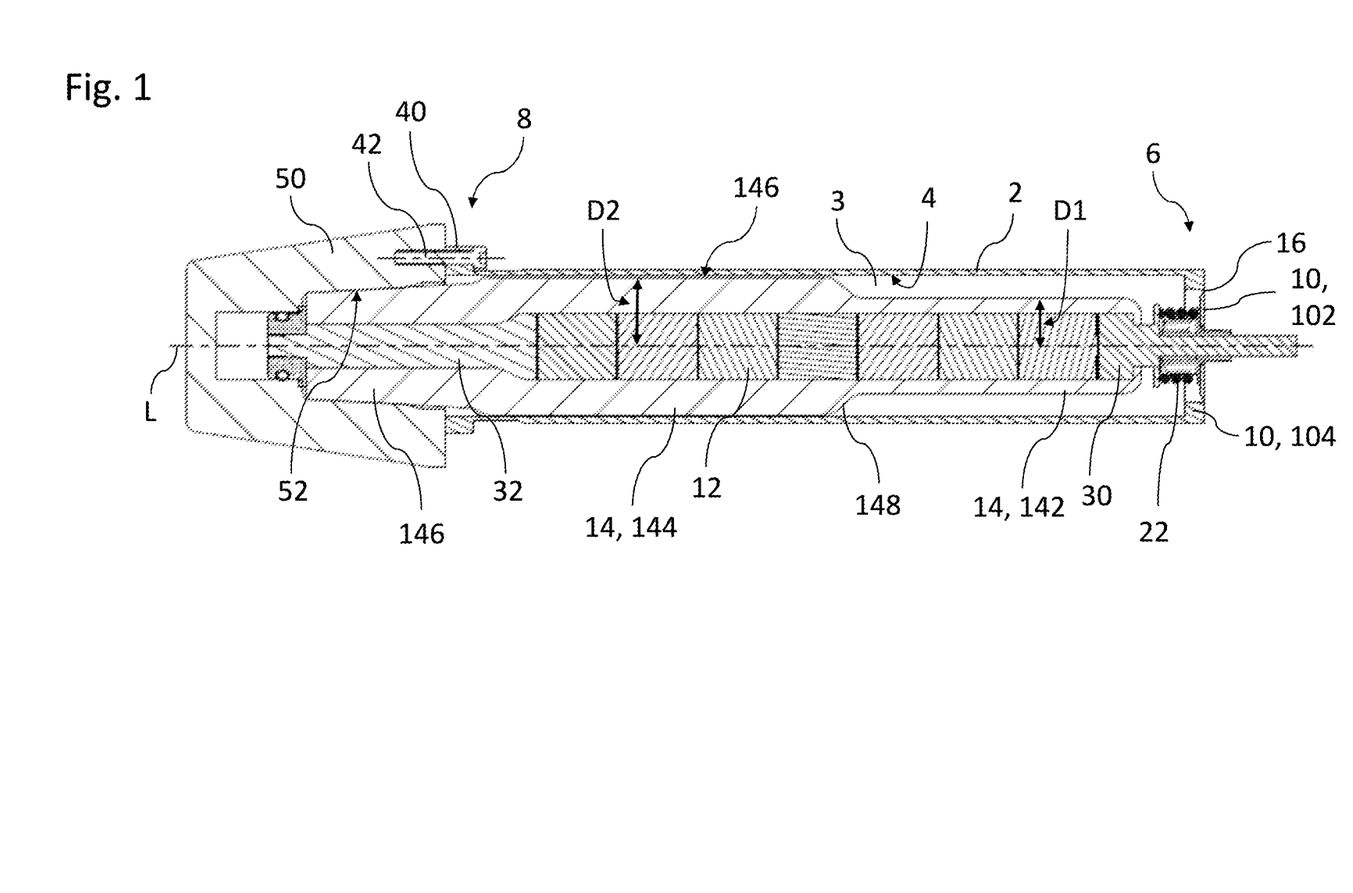
FIG. 1 is a schematic cross-sectional view of a surge arrester according to the present disclosure.

FIG. 1 a is a schematic cross-sectional view of a surge arrester according to the present disclosure. The surge arrester comprises an elongate housing 2, a first discharge electrode 30, a second connection electrode 32, an active member 12.

The elongate housing 2 has an interior 3 comprising an interior surface 4 that extends along a longitudinal axis L between a first end 6 and a second end 8 of the housing 2.

The surge arrester according to this example is formed as a plug-in surge arrester, where the longitudinal axis L is parallel to a corresponding plug-in direction. The housing 2 comprises a fastening means 40 for fastening the housing 2 to an electrical equipment, e.g., a high-voltage installation.

The first discharge electrode 30 is provided at the first end 6 of the housing 2. The first discharge electrode 30 may constitute a grounding terminal. The second connection electrode 32 is for connection to the electrical equipment. The second connection electrode 32 is provided at the second end 8 of the housing 2. The second electrode 32 may constitute a plug-in contact.

The active member 12 is arranged at least partially within the interior 3 and extending along the longitudinal axis L between the first and second electrodes 30, 32. The active member 12 may comprise a non-linear, voltage-dependent resistance element, for example including at least one varistor.

The active member 12 further comprises an insulation member 14, arranged at least partially within the interior 3. The insulation member 14 surrounds the resistance element of the active member 12 as seen within a normal cross-section normal, i.e., a cross-section perpendicular to the longitudinal axis L. The insulation member 14 may comprise an insulating cone portion 146 protruding along the longitudinal axis L beyond the second end 8 of the housing 2.

When the surge arrester is fitted into the electrical equipment, the active member 12 may be plugged into a socket 50 of the electrical equipment and the housing 2 can be fixed to the electrical equipment, for example via the socket 50, by the fastening means 40, for example via a screw 42. During plugging, the connection electrode 32 of the surge arrester is electrically connected to a current conductor of the electrical equipment. Concurrently, the insulating cone portion 146 and a mating insulating cone-shaped opening 52 of the socket 50 are pressed against each other. This achieves a suited plug-in connection which can withstand high loads and has a dielectrically high-grade insulation.

The surge arrester further comprises an enclosure 10. The enclosure 10 is fixed to or integrally formed with the housing 2 and closes the interior 3 at the first end 6. In FIG. 1, said enclosure 10 is shown as being integrally formed with the housing 2. It may, however, also be a part sperate and affixed thereto. The enclosure 10 comprises a predetermined breaking line 16 extending, for example annular or circular, around the longitudinal axis L, defining a radially inner enclosure portion 102 and a radially outer enclosure portion 104. By a breaking of the breaking line 16, the inner enclosure portion 102 can be completely separated from the outer enclosure portion 104.

The active member 12 has a normal cross-section, i.e., a cross-section perpendicular to the longitudinal axis L, that extends, at least partly, radially, i.e., radially outwardly from the longitudinal axis L beyond the breaking line 16. The normal cross-section of the active member 12 may vary in dependence on the position with respect to the longitudinal axis L. Thus, the active member 12 has at least at one position along the longitudinal axis L a normal cross-section that extends at least partly, radially beyond the breaking line 16. In some embodiments, the active member 12 has at least at one position along the longitudinal axis L a normal cross-section that extends completely, i.e., in a circumferential manner or ring-shaped manner, radially beyond the breaking line 16. Practically speaking, a portion of the active member 12 that extends radially beyond the breaking line 16 will interfere, upon axial movement of the active member in the direction of the second end 6, with the outer portion 102 of the enclosure 10. Axial movement is therefore limited.

Figure 2:
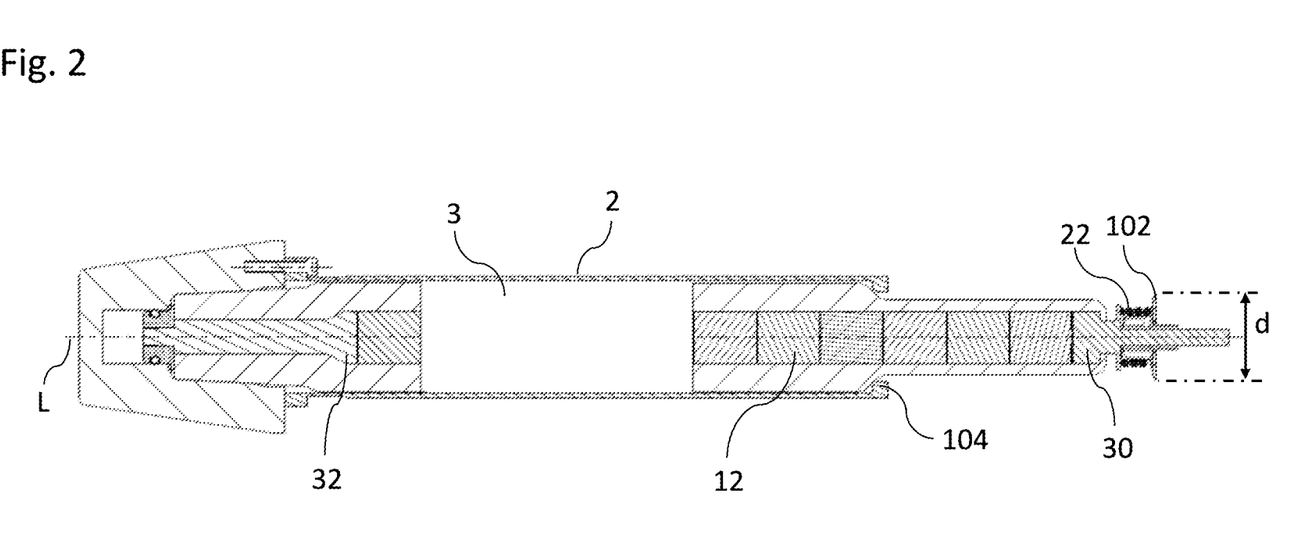
FIG. 2 is a corresponding view, showing the surge arrester in a state subsequently to a short circuit event.

If a pressure within the housing 2 increases, for example due to a fault condition, such as a short circuit event, the active member 12 may break, typically near the second end 8 of the housing 2, as illustrated in FIG. 2 and a portion of the active member 12 may be caused—by the increased pressure—to move along the longitudinal axis L toward the first end 6. Since the active member 12 has a normal cross-section that extends, at least partly, radially beyond the breaking line 16, this movement is stopped reliably by an interference between the active member 12 and the outer enclosure portion. In this manner, a well-defined pressure relief can be achieved, and an uncontrolled ejecting of critical parts can be prevented.

Accordingly, the surge arrester may be designed such that an axial movement of the active member 12 along the longitudinal axis L towards the first end 6 that is caused by a fault condition, such as a short circuit event, interferes with the outer enclosure portion 104 of the enclosure 10. More specifically, the outer enclosure portion 104 is designed to stop the axial movement of the active member 12 along the longitudinal axis L towards the first end 6. To this end, the outer enclosure portion 104 may be connected to the remainder of the housing 2 in an integral or one-piece manner. Alternatively, the enclosure may be formed by a separate part that is fixed to the housing 2 in a fluid-tight manner.

As exemplarily illustrated in FIGS. 1 and 2, the active member 12 may comprise a first active member portion 142 having a first cross-sectional extent, and a second active member portion 144 having a second cross-sectional extent, where the second cross-sectional extent extends radially beyond the first cross-sectional extent. For example, the first cross-sectional extent and the second cross-sectional extent may be circular, respectively. More specifically, the first active member portion 142 may have an outer surface that is shaped cylindrical with respect to the longitudinal axis L, having a first diameter D1, and the second active member portion 144 may have an outer surface that is shaped cylindrical with respect to the longitudinal L, having a second diameter D2, wherein second diameter D2 is larger than the first diameter.

The predetermined breaking line 16 may be circular, having a diameter d, where the diameter d of the breaking line 16 is larger than the first diameter D1 and smaller than the second diameter D2, i.e., D1<d<D2. In this way, the axial movement of the active member 12 along the longitudinal axis L can be reliably stopped by an interaction between the second active member portion 144 and the outer enclosure portion 104.

At a transition from the first active member portion 142 to the second active member portion 144, a shoulder 148 is formed, for example having a conical surface.

More generally, the cross-section of the active member 12, the first active member 142, and the second active member 144 is not necessarily circular. However, in some embodiments, a cross-section, i.e. a circumferential extension of the first active member portion 142 extends through the cross-section of the inner enclosure portion 102, and a cross section of the second active member portion 144 is at least partly, e.g., circumferentially, completely larger than the cross-section of the inner enclosure portion 102 such that it may not extend therethrough.

In the illustrated example, the second active member portion 144 comprises an outer wall portion 146 that is shaped cylindrically with respect to the longitudinal axis L in such a way that a movement of the outer wall portion 146 along the longitudinal axis L is guided by the interior surface 4. To this end, the interior surface 4 may be shaped cylindrically complementary to the outer wall portion 146 of the second active member portion 144 in such a way, that the second active member portion 144 is guided by the interior surface 4 during the movement of the active member 12 along the longitudinal axis L towards the first end 6 of the housing 2.

The enclosure 10, particularly, the inner enclosure portion 102 supports the active member 12, directly or indirectly. For example, the enclosure 10 may support the active member 12 by supporting the first discharge electrode 30.

Figure 3:
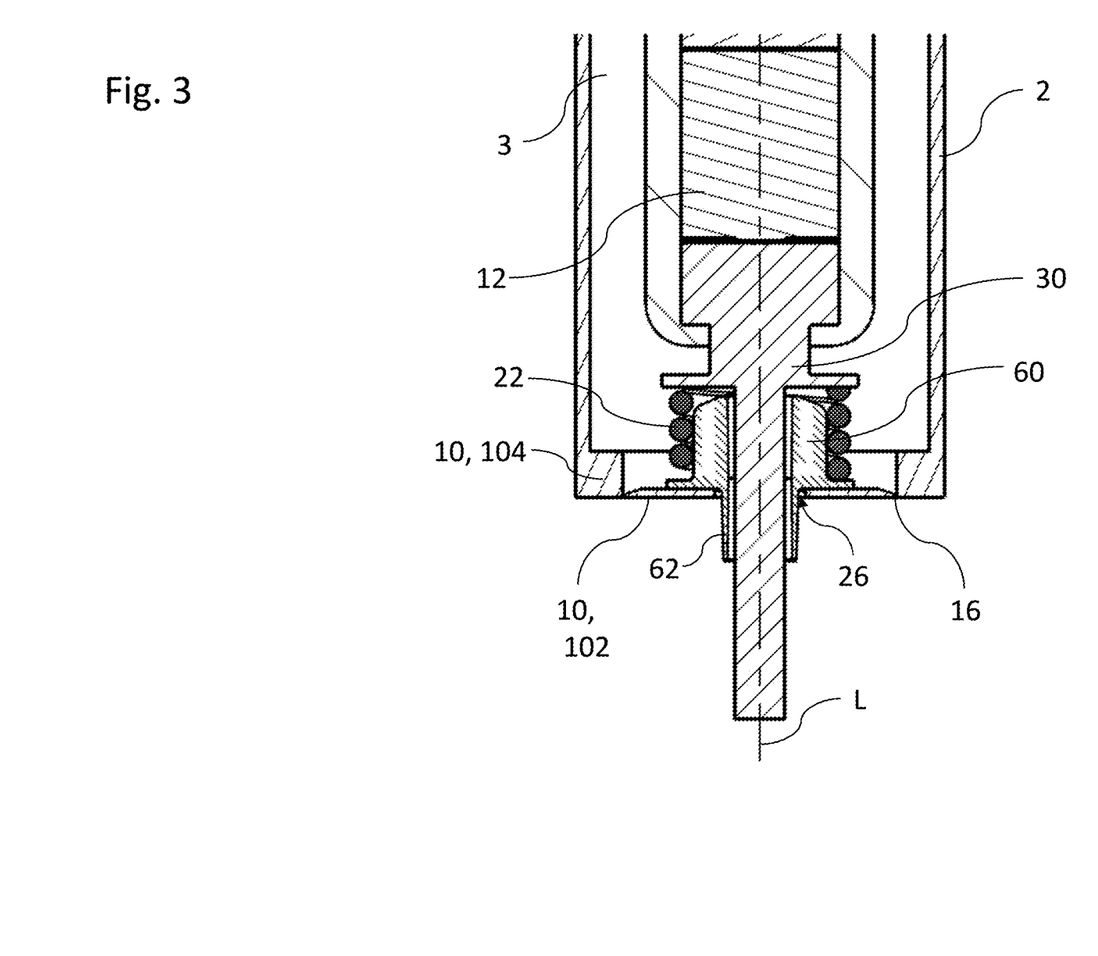
FIG. 3 is a detail view of FIG. 1 showing an area around the first end of the housing of the surge arrester.

As illustrated for example in FIG. 3, the surge arrester may further comprise a biased member 22, where the inner enclosure portion 102 supports the active part 12 (e.g., via the discharge electrode 30) by way of the biased member 22, directly or indirectly via further parts. The biased member 22 may be for example a spring. The biased member 22 may be arranged with respect to the longitudinal axis L between the active member 12 and the inner enclosure portion 102 and being biased in a direction parallel to the longitudinal axis L. The biased member 22 may be arranged such that it causes a pressure acting against the active member 12 directed along the longitudinal axis L towards the second end 8 of the housing 2. If the biasing member 22 is a spring, it may be strongly compressed in the biasing state, such that it on the one hand exerts a suitable biasing force and on the other hand may directly transfer forces from the active member to the inner enclosure portion, resulting in breaking along the breaking line 16 in case of a fault.

For example, the biased member 22 is ring-shaped and arranged surrounding the longitudinal axis L. This allows for a particularly uniform flux of force between the inner enclosure portion 102 and the active member 12.

In the illustrated example, the discharge electrode 30 is electrically and mechanically connected to the active member 12. The inner enclosure portion 102 shows a central through hole 26, where the discharge electrode 30 extends through the through hole 26. Thus, the discharge electrode 30 can be connected electrically easily from outside the housing 2 of the surge arrester. The biased member 22 surrounds the discharge electrode 30 as seen in a normal cross-section.

The surge arrester may further comprise a centering element 60 for centering the first discharge electrode 30, arranged, at least partly between the inner enclosure portion 102 and the active member 12 or a portion of the discharge electrode 30. The inner enclosure portion 102 may support the active member 12 via the centering element 60. For example, the inner enclosure portion 102 may support the discharge electrode 30 via both, the centering element 60 and the biased element 22.

Further, the centering element 60 may comprise a tube-shaped portion 62 for centering the discharge electrode 30 with respect to the longitudinal axis L. In the illustrated example, the tube-shaped portion 62 to this end extends through the through-hole 26 of the inner enclosure portion 102.

Figure 4:
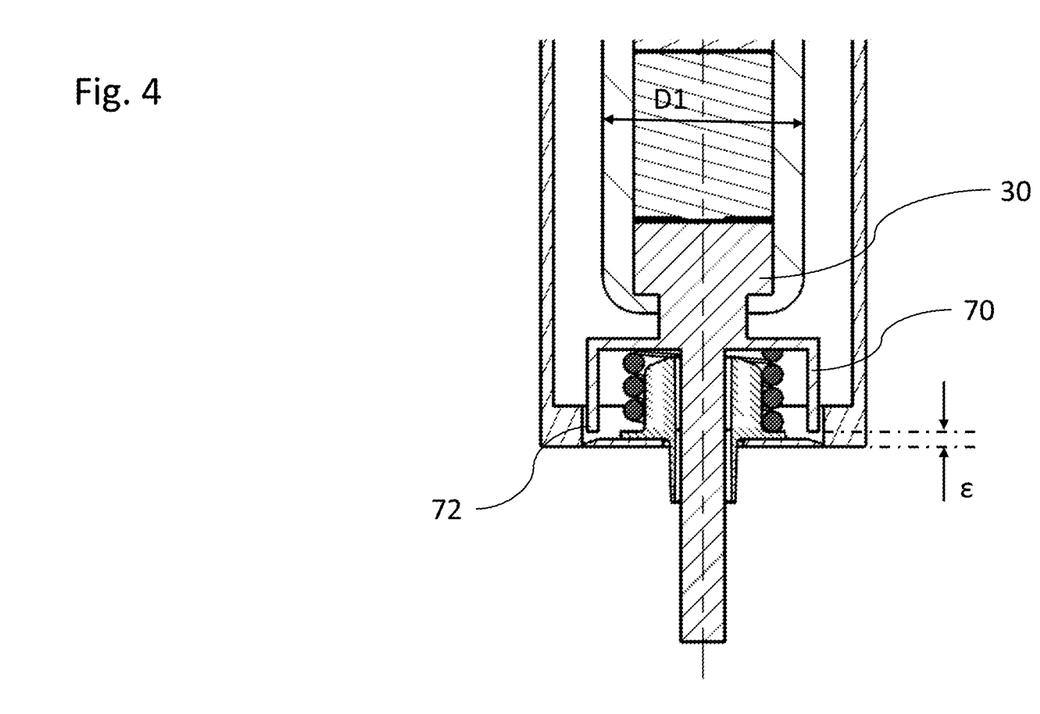
FIG. 4 is a schematic view of a variant comprising a breaking supporting member.

As illustrated in FIG. 4, the surge arrester may further comprise a breaking supporting member 70 that is designed to support a breaking of the enclosure 10 at the predetermined breaking line 16 in case of a short-circuit event or similar fault condition. In some embodiments, the breaking support member 70 is fixed to the active member and/or the discharge electrode 30, directly or indirectly.

The breaking supporting member 70 may comprise a sharp edge portion 72 that may be shaped complementary to the breaking line 16. The edge portion 72 may be arranged, as seen along the longitudinal axis L, at a small distance E from the breaking line 16. For example, the small distance E may be less than 10% of the first diameter D1 of the first active member portion 142.

Summarizing, force may be transmitted from the interior, particularly the active member 14, to the inner enclosure portion and/or the breaking line 16 in a number of different ways, directly and indirectly. For example, this may be effected via a biasing member 22, via a centering element 60, via the discharge electrode 30, and/or via a breaking supporting member 70.

The invention claimed is:

1. A surge arrester, comprising
an elongate housing having an interior comprising an interior surface that extends along a longitudinal axis between a first end and a second end of said housing;
an active member, arranged at least partially within the interior and extending along the longitudinal axis; and
an enclosure that is fixed to or integrally formed with the housing and that closes the interior at the first end,
the enclosure comprising a predetermined breaking line,
the active member having a cross section that extends, at least partly, radially beyond the breaking line, and
the breaking line extending around the longitudinal axis, defining an inner enclosure portion and an outer enclosure portion.

2. The surge arrester of claim 1, wherein the surge arrester is designed such that an axial movement of the active member along the longitudinal axis towards the first end interferes with the outer enclosure portion of the enclosure.

3. The surge arrester of claim 2, wherein the outer enclosure portion is designed to stop the axial movement of the active member along the longitudinal axis towards the first end.

4. The surge arrester of claim 1, wherein the active member comprises a first active member portion having a first cross-sectional extent, and a second active member portion having a second cross-sectional extent, the second cross-sectional extent extending radially beyond the first cross-sectional extent.

5. The surge arrester of claim 4, wherein a cross-sectional extent of the predetermined breaking line is radially completely contained within the second cross-sectional extent.

6. The surge arrester of claim 4, wherein a shoulder is provided at a transition from the first to the second active member portion, the first active member portion being provided closer to the first end than the second active member portion.

7. The surge arrester of claim 4, wherein the second active member portion is designed to break in case of a short circuit event.

8. The surge arrester of claim 4, wherein the relative cross-sections of the first active member portion and the inner enclosure portion are such that the first-mentioned cross-section may extend through the latter-mentioned, and wherein the cross section of the second active member portion is at least partly larger than that of the inner enclosure portion such that it may not extend therethrough.

9. The surge arrester of claim 4, wherein the second active member portion comprises an outer wall portion that is shaped in such a way that a movement of the outer wall portion along the longitudinal axis is guided by the interior surface.

10. The surge arrester of claim 1, wherein the predetermined breaking line is at least substantially circular.

11. The surge arrester of claim 1, wherein the enclosure supports the active member.

12. The surge arrester of claim 1, further comprising a biased member arranged with respect to the longitudinal axis between the active member and the inner enclosure portion and being biased in a direction parallel to the longitudinal axis.

13. The surge arrester of claim 12, wherein the biased member is arranged such that it causes a pressure acting against the active member directed along the longitudinal axis towards the second end of the housing.

14. The surge arrester of claim 12, wherein the biased member is at least to a first approximation ring-shaped and arranged surrounding the longitudinal axis.

15. The surge arrester of claim 1, wherein the surge arrester is designed such that an axial movement of the active member along the longitudinal axis towards the first end interferes with the outer enclosure portion of the enclosure, and
wherein the active member extends between a first discharge electrode provided at the first end of the housing and a second connection electrode provided at the second end of the housing, the first discharge electrode being electrically and mechanically connected to the active member and extending through a through hole formed in the inner enclosure portion.

16. The surge arrester of claim 12, wherein the enclosure supports the active member, and
wherein the biased member surrounds a first discharge electrode.

17. A system, comprising:
an electrical equipment; and
a surge arrester connected to the electrical equipment, the surge arrester comprising:
an elongate housing having an interior comprising an interior surface that extends along a longitudinal axis between a first end and a second end of said housing;
an active member, arranged at least partially within the interior and extending along the longitudinal axis; and
an enclosure that is fixed to or integrally formed with the housing and that closes the interior at the first end,
the enclosure comprising a predetermined breaking line, the active member having a cross section that extends, at least partly, radially beyond the breaking line, and
the breaking line extending around the longitudinal axis, defining an inner enclosure portion and an outer enclosure portion.

18. The system of claim 17, wherein the surge arrester is designed such that an axial movement of the active member along the longitudinal axis towards the first end interferes with the outer enclosure portion of the enclosure.

19. A method comprising:
arranging an active member at least partially within an interior of an elongate housing of a surge arrester, the interior comprising an interior surface that extends along a longitudinal axis between a first end and a second end of said housing and extending along the longitudinal axis;
fixing an enclosure to the housing to close the interior at the first end,
the enclosure comprising a predetermined breaking line, the active member having a cross section that extends, at least partly, radially beyond the breaking line, and
the breaking line extending around the longitudinal axis, defining an inner enclosure portion and an outer enclosure portion.

20. The method of claim 19, further comprising moving the active member axially along the longitudinal axis towards the first end to interfere with the outer enclosure portion of the enclosure.

\* \* \* \* \*